United States Patent
Wang et al.

(10) Patent No.: US 9,209,666 B2
(45) Date of Patent: Dec. 8, 2015

(54) BRUSHLESS DC MOTOR

(71) Applicant: Zhongshan Broad-Ocean Motor Co., Ltd., Zhongshan (CN)

(72) Inventors: Xiongcheng Wang, Zhongshan (CN); Yueqiang Yu, Zhongshan (CN); Mingpan Pan, Zhongshan (CN); Wenqing Bian, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 290 days.

(21) Appl. No.: 13/844,985

(22) Filed: Mar. 17, 2013

(65) Prior Publication Data

US 2014/0184034 A1    Jul. 3, 2014

(30) Foreign Application Priority Data

Dec. 28, 2012 (CN) ...................... 2012 2 0741207 U

(51) Int. Cl.
*H02K 5/15* (2006.01)
*H02K 11/00* (2006.01)

(52) U.S. Cl.
CPC .............. *H02K 11/0073* (2013.01); *H02K 5/15* (2013.01)

(58) Field of Classification Search
USPC ............ 310/12.27, 254.1, 43, 64, 68 B, 68 D, 310/68 R, 89, 90
See application file for complete search history.

(56) References Cited

U.S. PATENT DOCUMENTS

| 2,668,687 | A | * | 2/1954 | Fowler | 254/126 |
| 5,006,744 | A | * | 4/1991 | Archer et al. | 310/89 |
| 8,816,548 | B2 | * | 8/2014 | Tomizawa et al. | 310/68 D |
| 2010/0141069 | A1 | * | 6/2010 | Lu | 310/89 |
| 2010/0327677 | A1 | * | 12/2010 | Iwai et al. | 310/64 |
| 2011/0210630 | A1 | * | 9/2011 | Liu et al. | 310/90 |

FOREIGN PATENT DOCUMENTS

JP    10316136 A    * 12/1998

OTHER PUBLICATIONS

Machine Translation for JP 10316136.*

* cited by examiner

*Primary Examiner* — Tran Nguyen
(74) *Attorney, Agent, or Firm* — Matthias Scholl, PC; Matthias Scholl

(57) ABSTRACT

A brushless DC motor, including: a rotating shaft; a rotor assembly; a stator assembly; a casing; a rear cover; and a control box. The rotating shaft is connected together with the rotor assembly. The stator assembly is sleeved outside the rotor assembly. The casing is connected together with the stator assembly. The rear cover includes a rear bearing seat in the middle for receiving a rear bearing. A plurality of support legs protrudes outwards from a wall surface on the outer side of the rear bearing seat, and is supported and installed on a flanged edge folded outwards from an end surface of the casing. One end of the rotating shaft is supported on the rear bearing. The control box is installed on the casing.

9 Claims, 9 Drawing Sheets

BRUSHLESS DC MOTOR

CROSS-REFERENCE TO RELATED APPLICATIONS

Pursuant to 35 U.S.C. §119 and the Paris Convention Treaty, this application claims the benefit of Chinese Patent Application No. 201220741207.0 filed Dec. 28, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a brushless DC motor.

2. Description of the Related Art

The traditional servo motor has the defects of complex structure, larger volume, high cost, poor reliability, low efficiency and low matching precision, and cannot meet the demands of market.

SUMMARY OF THE INVENTION

In view of the above-described problems, it is one objective of the invention to provide a brushless DC motor. The brushless DC motor has the advantages of simple structure, small volume, low cost, good reliability, high efficiency, and high matching precision.

To achieve the above objective, in accordance with one embodiment of the invention, there is provided a brushless DC motor, comprising: a rotating shaft; a rotor assembly; a stator assembly; a casing; a rear cover; and a control box. The rotating shaft is connected together with the rotor assembly. The stator assembly is sleeved outside the rotor assembly. The casing is connected together with the stator assembly. The rear cover comprises a rear bearing seat in a middle for receiving a rear bearing. A plurality of support legs protrudes outwards from a wall surface on an outer side of the rear bearing seat, and is supported and installed on a flanged edge folded outwards from an end surface of the casing. One end of the rotating shaft is supported on the rear bearing. The control box is installed on the casing.

In a class of this embodiment, a chamber is formed in the middle of the casing, a front bearing seat for receiving a front bearing is arranged on a bottom wall of the casing. An opening is formed at the top of the casing. The flanged edge is folded outwards from the outside of the opening and the end surface of the casing. The rotor assembly and the stator assembly are assembled in the chamber. The other end of the rotating shaft is supported on the front bearing, and the rear cover is locked on the flanged edge through screws.

In a class of this embodiment, the number of the support legs is four, and the four support legs are distributed into a cross shape.

In a class of this embodiment, an arc-shaped convex plate protrudes from a bottom surface of the support leg, and positioned with a wall surface on an inner side of the casing in a matched manner.

In a class of this embodiment, the support legs comprise a first support leg, a second support leg, a third support leg, and a fourth support leg. The first support leg and the third support leg are symmetrical about the rear bearing seat. The second support leg and the fourth support leg are symmetrical about the rear bearing seat. The first support leg is longer than the second support leg. The second support leg and the fourth support leg are supported on the flanged edge, and the first support leg and the third support leg are supported on the flanged edge and locked through screws.

In a class of this embodiment, an end surfaces on an outer sides of the second support leg and the fourth support leg are arc-shaped surfaces, the control box covers the rear cover, and the arc-shaped surfaces are matched with a wall surface on an inner side of the control box.

In a class of this embodiment, two grooves are formed on an end surface of the control box, and the first support leg and the third support leg are embedded in the two grooves respectively.

In a class of this embodiment, a circuit board is installed in the control box, and the control box is supported on the flanged edge and locked through screws.

In a class of this embodiment, a protective cover is installed on the bottom of the casing, far from one end of the opening.

In a class of this embodiment, the casing is formed by stretching.

Advantages of the invention are summarized below.

(1) The brushless DC motor comprises a rotating shaft, a rotor assembly, a stator assembly, a casing, a rear cover and a control box. The rotating shaft is connected together with the rotor assembly. The stator assembly is sleeved outside the rotor assembly. The casing is connected together with the stator assembly. The rear cover comprises a rear bearing seat for receiving a rear bearing in the middle. A plurality of support legs extends out from the wall surface on the outer side of the rear bearing seat and is supported and installed on an outwardly folded edge at the end part of the casing, one end of the bearing is supported on the rear bearing of the rear cover, and the control box is installed on the casing. Thus, the brushless DC motor is simple in structure, small in volume, low in cost, good in reliability, high in efficiency and high matching precision;

(2) A chamber is formed in the middle of the casing, a front bearing seat for receiving a front bearing is arranged on the bottom wall of the casing, an opening is formed at the top of the casing, a flanged edge is folded outwards from the outside of the opening and the end surface of the casing, both the rotor assembly and the stator assembly are assembled in the chamber, the other end of the rotating shaft is supported on the front bearing, and the rear cover is locked on the flanged edge through screws. Thus, the structural design is reasonable and compact, and the volume is small.

(3) The number of the support legs is four, the four support legs are distributed into a cross shape, and the rear cover has light weight. Thus, weight of the motor is reduced when the strength of the rear cover is ensured, and the cost is reduced.

(4) An arc-shaped convex plate protrudes from the bottom surface of the support leg, and is positioned with the wall surface on the inner side of the casing in a matched manner, and the rear cover is positioned through the convex plate, so as to prevent the rear cover from moving horizontally.

(5) Two grooves are formed on the end surface of the control box, and the first support leg and the third support leg are embedded in the two grooves respectively. Thus, the purpose of positioning and installing the control box is realized, and the assembly is easy;

(6) A protective cover is installed on the bottom surface of the casing, far from one end of the opening, a fan blade is installed in the protective cover, and the protective cover is separated for protecting the fan blade.

(7) The casing is formed by stretching and suitable for mass production. Thus, the cost is low.

DETAILED DESCRIPTION OF THE EMBODIMENTS

Example 1

Figure 1:
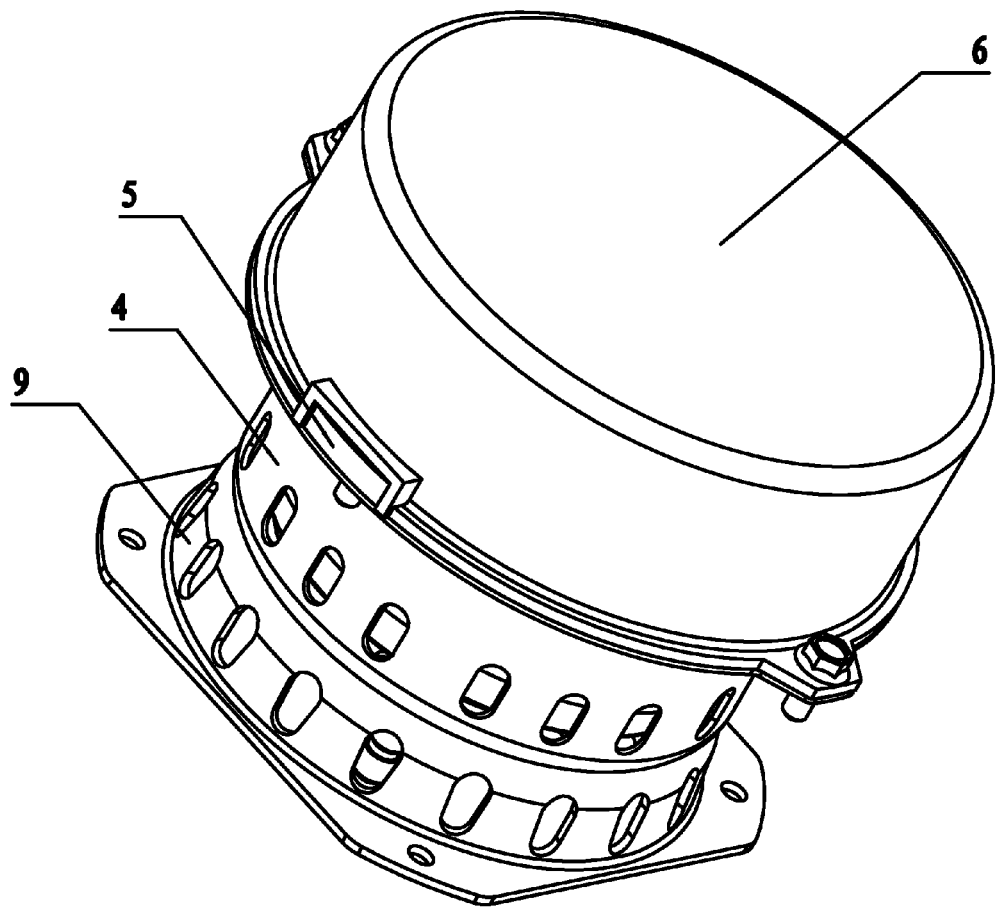
FIG. 1 is a stereograph of a brushless DC motor of the invention.
Figure 2:
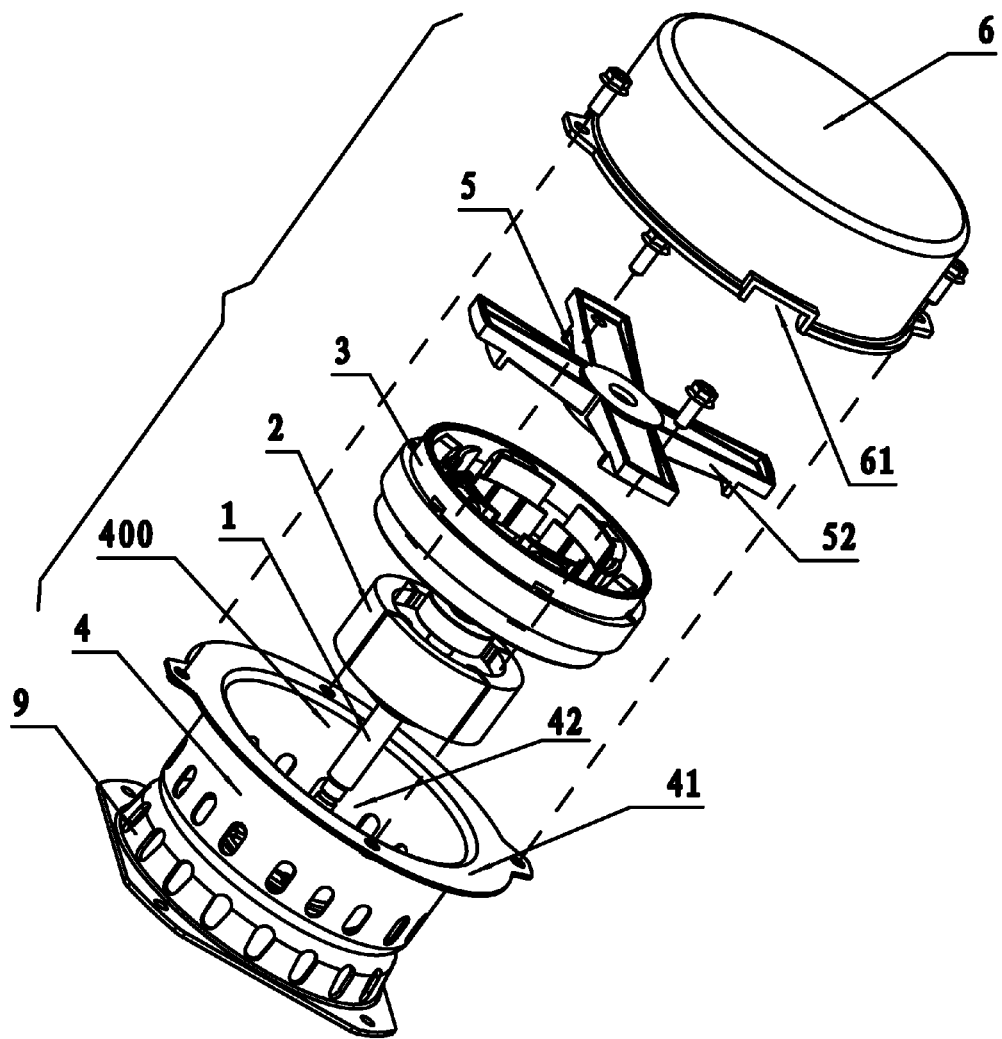
FIG. 2 is an exploded view of a brushless DC motor of the invention.
Figure 3:
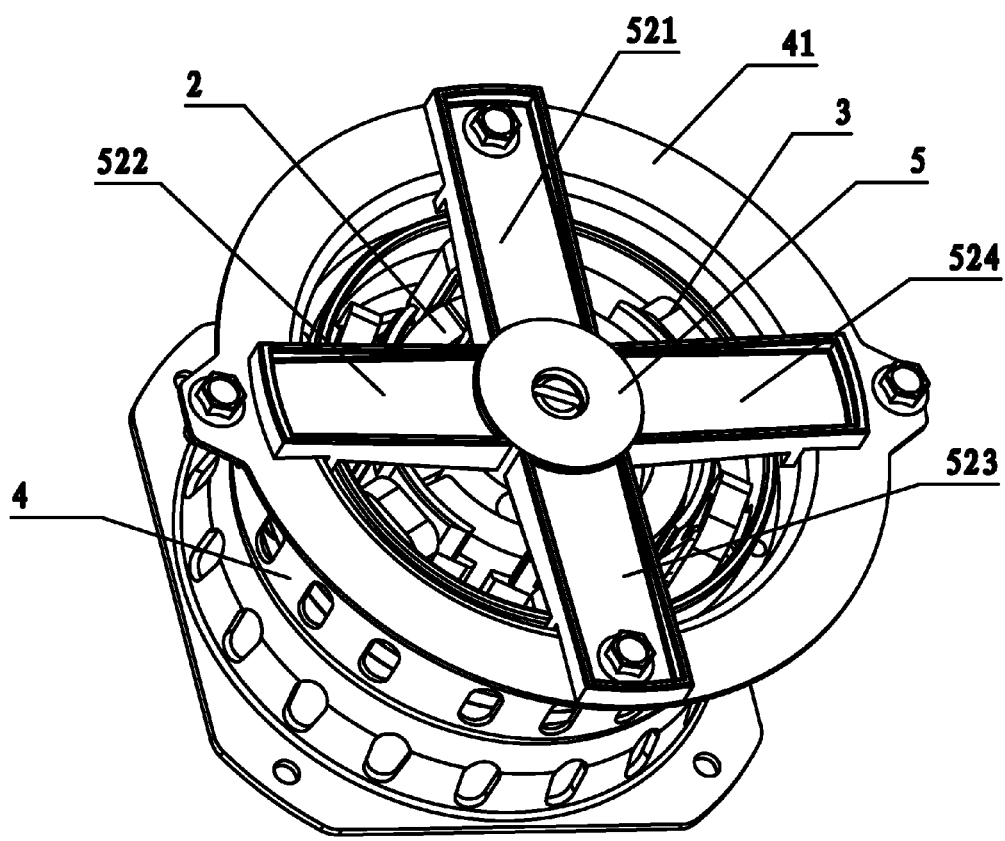
FIG. 3 is a stereograph of a brushless DC motor of the invention free of a control box.
Figure 4:
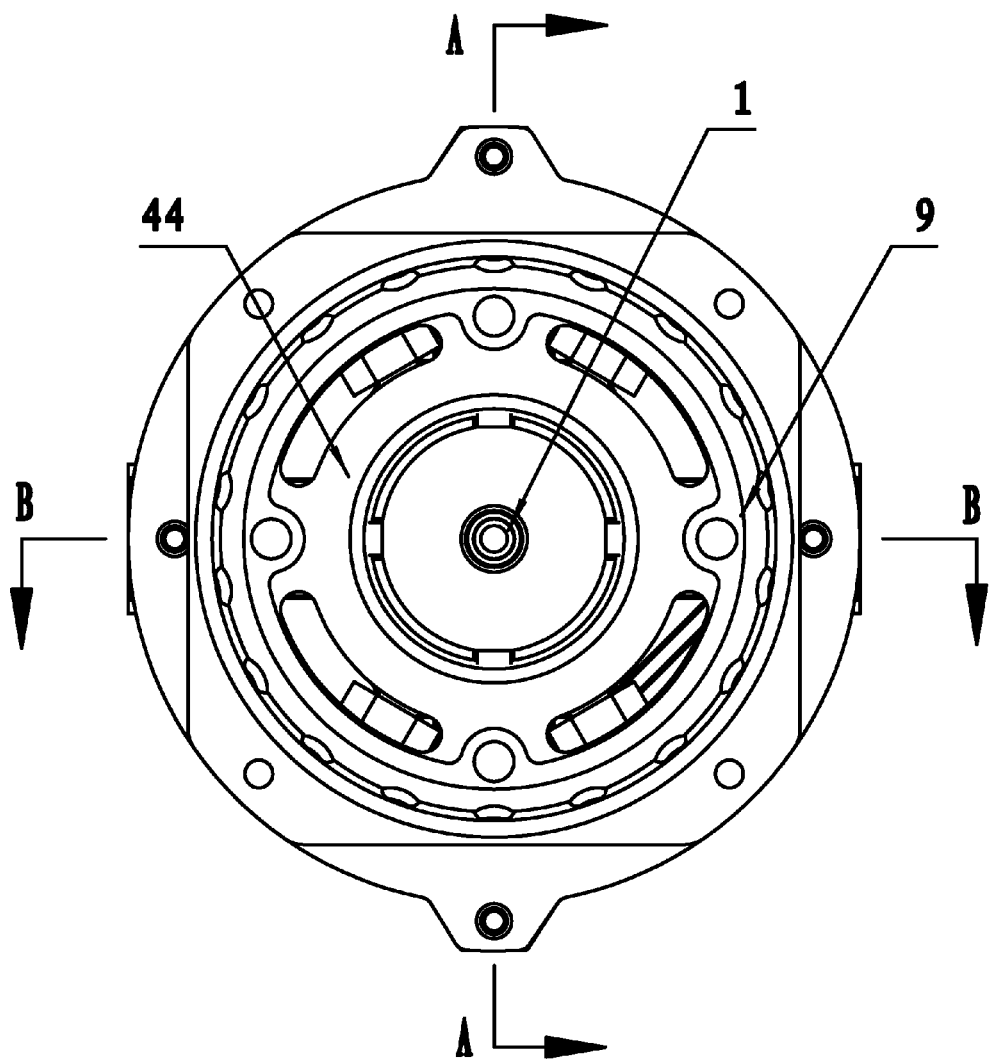
FIG. 4 is a schematic diagram of a brushless DC motor of the invention.
Figure 5:
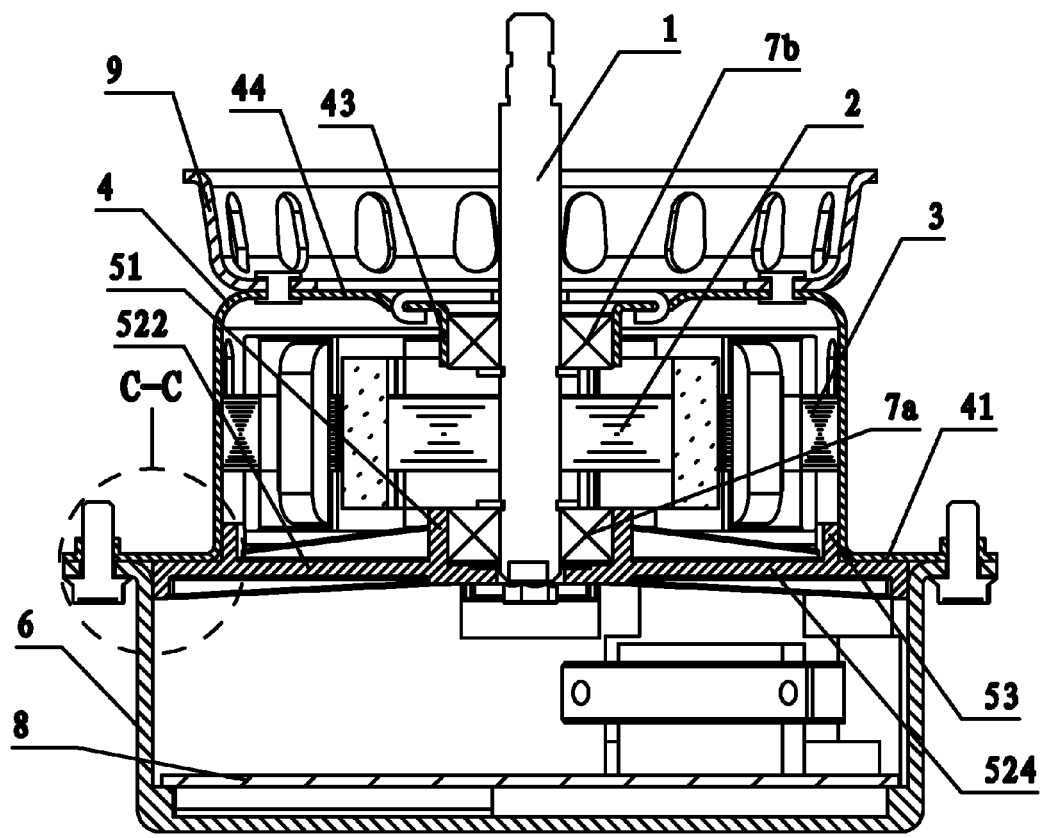
FIG. 5 is an exploded view of FIG. 4 taken from line A-A.
Figure 6:
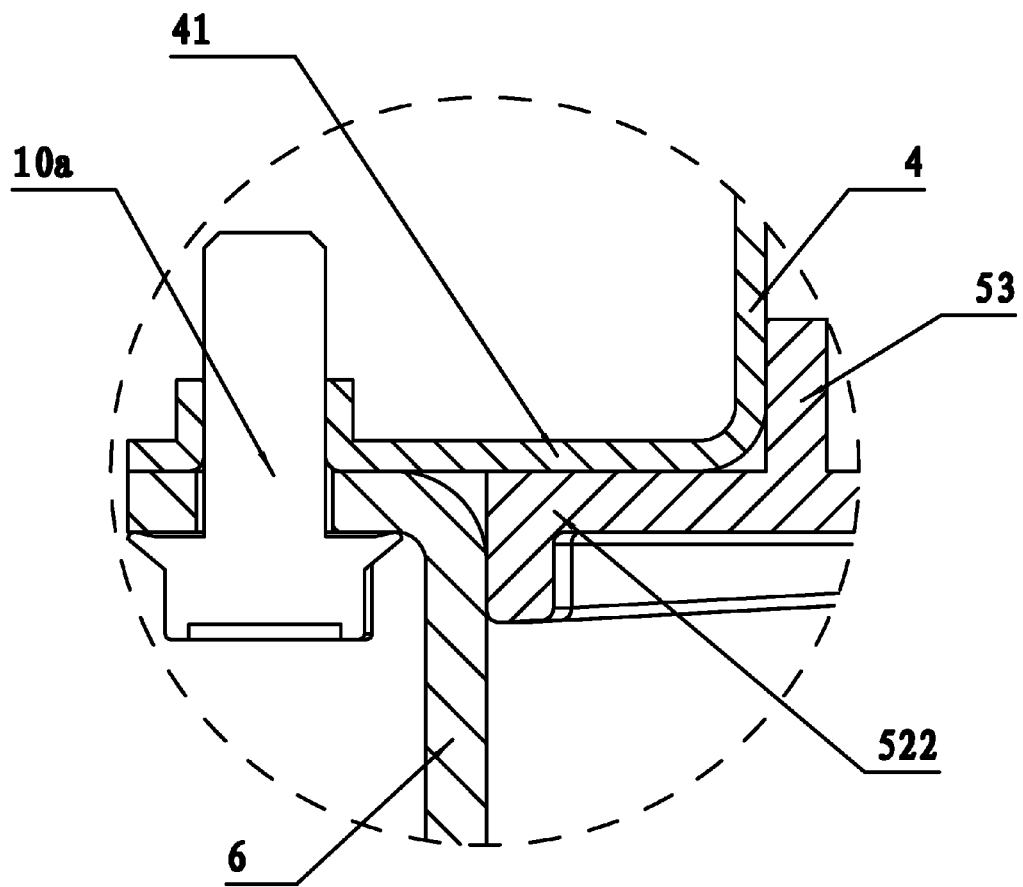
FIG. 6 is an enlarged view of part C-C of FIG. 5.
Figure 7:
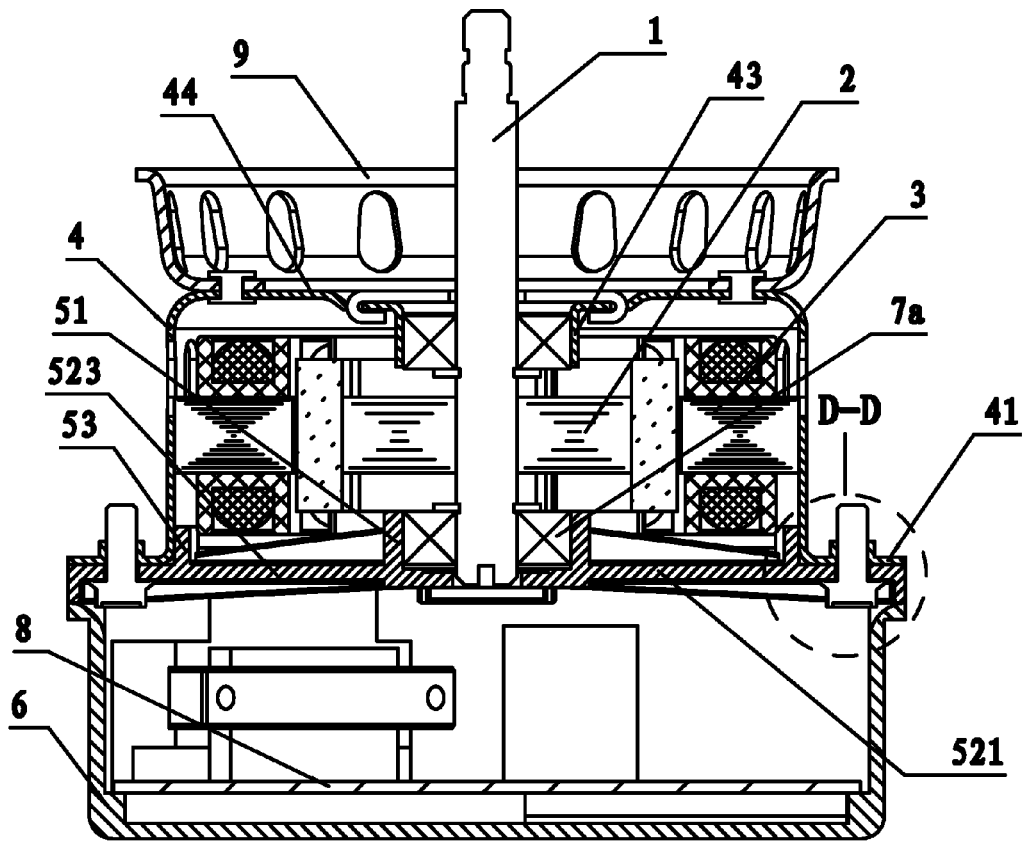
FIG. 7 is an exploded view of FIG. 4 taken from line B-B.
Figure 8:
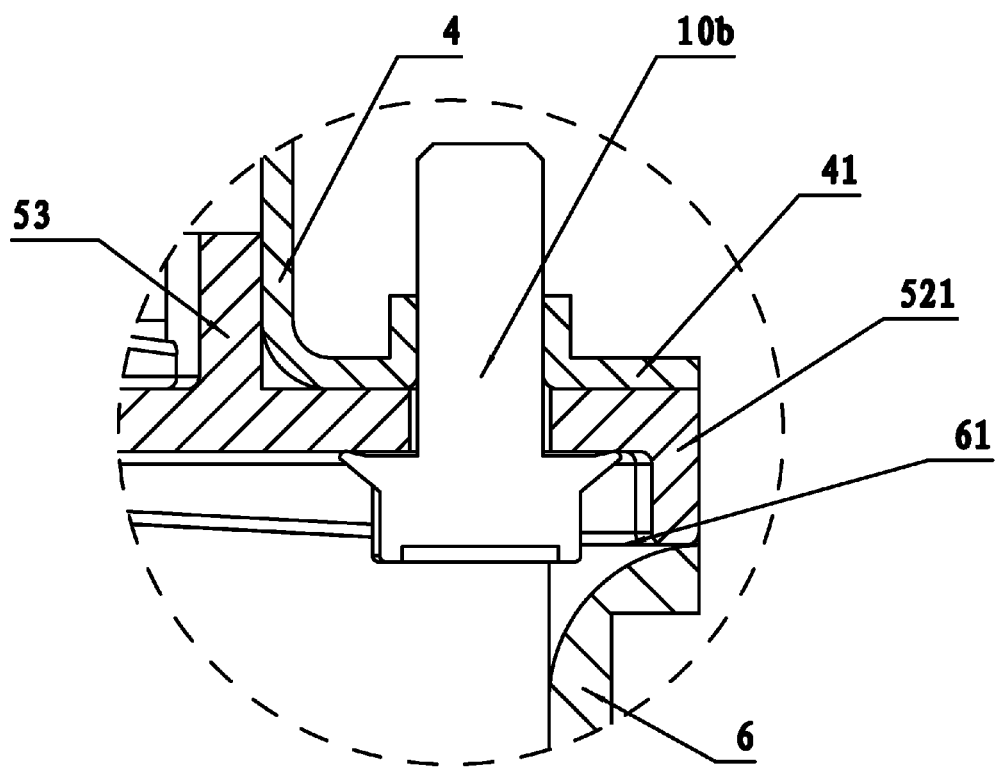
FIG. 8 is an enlarged view of part D-D of FIG. 7.
Figure 9:
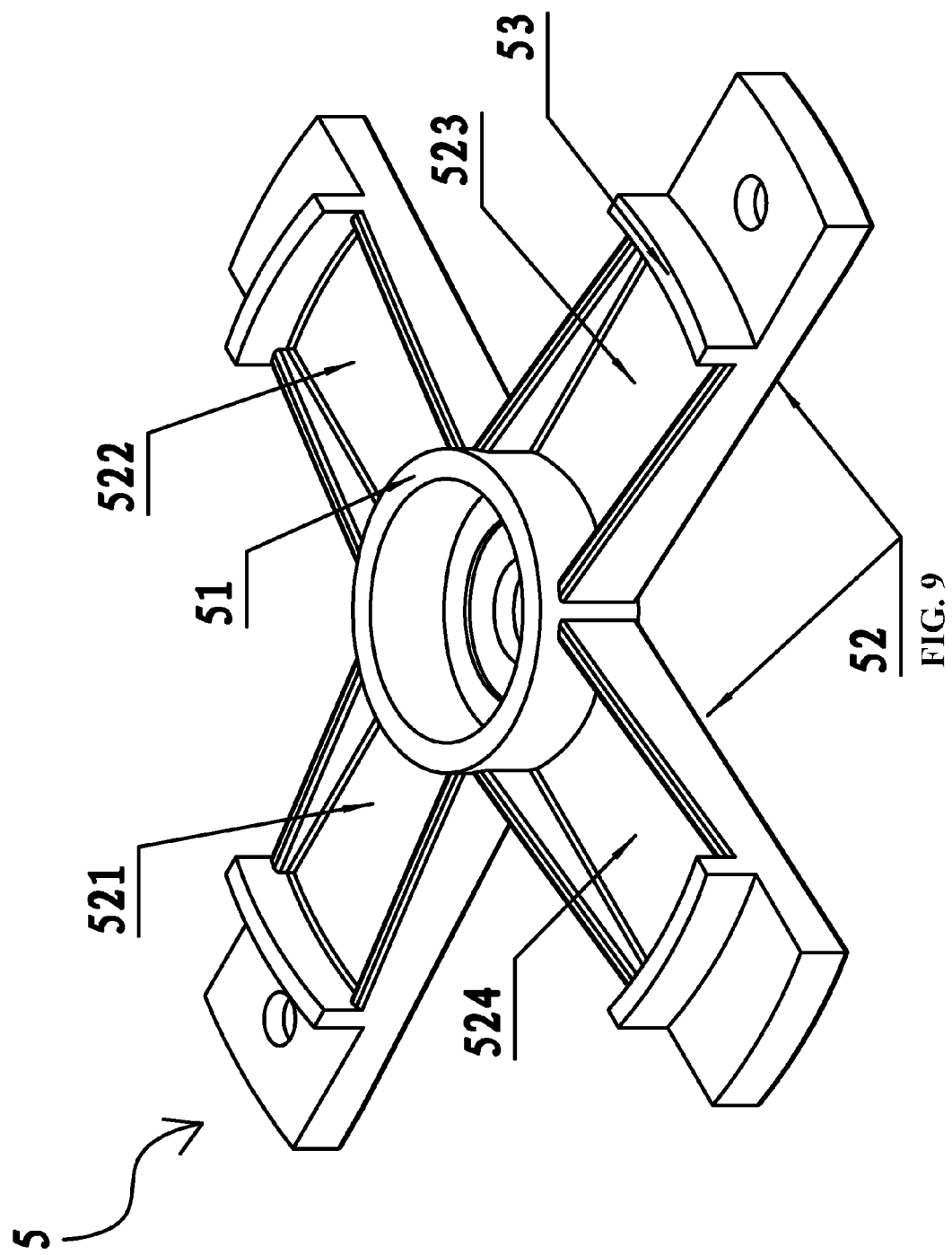
FIG. 9 is a stereograph of a rear cover of a brushless DC motor of the invention.

As shown in FIGS. 1-9, a brushless DC motor comprises a rotating shaft 1, a rotor assembly 2, a stator assembly 3, a casing 4, a rear cover 5 and a control box 6. The rotating shaft 1 is connected together with the rotor assembly 2. The stator assembly 3 is sleeved outside the rotor assembly 2. The casing 4 is connected together with the stator assembly 3. The rear cover 5 comprises a rear bearing seat 51 for receiving a rear bearing 7a in the middle. A plurality of support legs 52 protrudes outwards from the wall surface on the outer side of the rear bearing seat 51, and is supported and installed on a flanged edge 41 folded outwards from the end part of the casing 4. One end of the rotating shaft 1 is supported on the rear bearing 7a of the rear cover 5, and the control box 6 is installed on the casing 4.

Example 2

On the basis of Example 1, the technical characteristics are added as follows: a chamber 42 is formed in the middle of the casing 4; a front bearing seat 43 for receiving a front bearing 7b is arranged on the bottom wall 44 of the casing 4; an opening 400 is formed at the top of the casing 4; a flanged edge 41 is folded outwards from the outside of the opening 400 and the end surface of the casing 4; the rotor assembly and the stator assembly 3 are assembled in the chamber 42; the other end of the rotating shaft 1 is supported on the front bearing 7b, and the rear cover 5 is locked on the flanged edge 41 through screws.

Example 3

On the basis of Example 2, the technical characteristics are added as follows: the number of the support legs 52 is four, and the four support legs are distributed into a cross shape.

Example 4

On the basis of Example 1, 2, or 3, the technical characteristic is added as follows: an arc-shaped convex plate 53 protrudes from the bottom surface of the support leg 52, and positioned with the wall surface on the inner side of the casing 4 in a matched manner.

Example 5

On the basis of Example 4, the technical characteristics are added as follows: the support legs 52 comprise a first support leg 521, a second support leg 522, a third support leg 523 and a fourth support leg 524; the first support leg 521 and the third support leg 523 are symmetrical about the rear bearing seat 51; the second support leg 522 and the fourth support leg 524 are symmetrical about the rear bearing seat 51; the first support leg 521 is longer than the second support leg 522; the second support leg 522 and the fourth support leg 524 are supported on the flanged edge 41, and the first support leg 521 and the third support leg 523 are supported on the flanged edge 41 and locked through screws 10b.

Example 6

On the basis of Example 5, the technical characteristics are added as follows: the end surfaces on the outer sides of the second support leg 522 and the fourth support leg 524 are arc-shaped surfaces, the control box 6 covers the rear cover 5, and the arc-shaped surfaces are matched with the wall surface on the inner side of the control box 6.

Example 7

On the basis of Example 6, the technical characteristics are added as follows: two grooves 61 are formed on the end surface of the control box 6, and the first support leg 521 and the third support leg 523 are embedded in the two grooves 61 respectively.

Example 8

On the basis of Example 1, the technical characteristics are added as follows: a circuit board 8 is installed in the control box 6, and the control box 6 is supported on the flanged edge 41 and locked through screws 10a.

Example 9

On the basis of Example 2, the technical characteristic is added as follows: a protective cover 9 is installed on the bottom of the casing 4, far from one end of the opening 400.

Example 10

On the basis of Example 1, the technical characteristic is added as follows: the casing 4 is formed by stretching.

The brushless DC motor comprises a rotating shaft 1, a rotor assembly 2, a stator assembly 3, a casing 4, a rear cover 5 and a control box 6. The rotating shaft 1 is connected together with the rotor assembly 2. The stator assembly 3 is sleeved outside the rotor assembly 2. The casing 4 is connected together with the stator assembly 3. The rear cover 5 comprises a rear bearing seat 51 for receiving a rear bearing 7a in the middle. A plurality of support legs 52 extends out from the wall surface on the outer side of the rear bearing seat 51, and are supported and installed on a flanged edge 41 folded outwards from the end part of the casing 4. One end of the rotating shaft 1 is supported on the rear bearing 7a of the rear cover 5, and the control box 6 is installed on the casing 4.

The brushless DC motor has the advantages of simple structure, small volume, low cost, good reliability, high efficiency and high matching precision.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A brushless DC motor, comprising:
   a) a rotating shaft;
   b) a rotor assembly;
   c) a stator assembly;
   d) a casing comprising an end;
   e) a rear cover comprising a first support leg, a second support leg, a third support leg, a fourth support leg, and a rear bearing seat, the rear bearing seat comprising an outer side wall; and
   f) a control box comprising a side wall, the side wall comprising an outer surface and an inner surface;
   wherein:
   the rotating shaft is connected together with the rotor assembly;
   the stator assembly is sleeved outside the rotor assembly;
   the casing is connected together with the stator assembly;
   the end of the casing is bent away from the rotating shaft;
   a flanged edge is formed on the end of the casing;
   the rear bearing seat is disposed in the middle of the rear cover;
   the first support leg, the second support leg, the third support leg, and the fourth support leg protrude outwards from the outer side wall of the rear bearing seat and are supported and installed on the flanged edge;
   each of the first support leg, the second support leg, the third support leg, and the fourth support leg comprises an outer side surface;
   the first support leg and the third support leg are symmetrical about the rear bearing seat;
   the second support leg and the fourth support leg are symmetrical about the rear bearing seat;
   the first support leg and the third support leg are longer in length than the second support leg and the fourth support leg;
   a rear bearing is disposed on the rear bearing seat;
   one end of the rotating shaft is supported on the rear bearing;
   the control box is installed on the casing;
   the outer side surface of the second support leg and the outer side surface of the fourth support leg are matched with the inner surface;
   the outer side surface of the second support leg and the outer side surface of the fourth support leg are substantially flush with and in contact with the inner surface;
   the outer side surface of the first support leg and the outer side surface of the third support leg are substantially flush with the outer surface;
   two grooves are formed on the side wall of the control box; and
   the first support leg and the third support leg are respectively embedded in the two grooves.

2. The motor of claim 1, wherein
   a chamber is formed in the middle of the casing;
   a front bearing seat is arranged on a bottom wall of the casing;
   an opening is formed at the top of the casing;
   the flanged edge is bent outwards from the opening;
   the rotor assembly and the stator assembly are assembled in the chamber;
   a front bearing is disposed on the front bearing seat;
   the other end of the rotating shaft is supported on the front bearing; and
   the rear cover is locked on the flanged edge through screws.

3. The motor of claim 2, wherein the first support leg, the second support leg, the third support leg, and the fourth support leg form a cross shape.

4. The motor of claim 1, wherein the casing comprises an inner side wall; an arc-shaped convex plate protrudes from a bottom surface of each of the first support leg, the second support leg, the third support leg, and the fourth support leg; and the arc-shaped convex plate is in contact with the inner side wall of the casing.

5. The motor of claim 2, wherein the casing comprises an inner side wall; an arc-shaped convex plate protrudes from a bottom surface of each of the first support leg, the second support leg, the third support leg, and the fourth support leg; and the arc-shaped convex plate is in contact with the inner side wall of the casing.

6. The motor of claim 3, wherein the casing comprises an inner side wall; an arc-shaped convex plate protrudes from a bottom surface of each of the first support leg, the second support leg, the third support leg, and the fourth support leg; and the arc-shaped convex plate is in contact with the inner side wall of the casing.

7. The motor of claim 1, wherein a circuit board is installed in the control box, and the control box is supported and locked on the flanged edge.

8. The motor of claim 2, wherein a protective cover is installed on the bottom of the casing, and the protective cover is arranged away from one end of the opening.

9. The motor of claim 1, wherein the casing is formed by stretching.

* * * * *